A. NEWBROUGH.
Churn.
No. 49,138.
Patented Aug. 1, 1865.
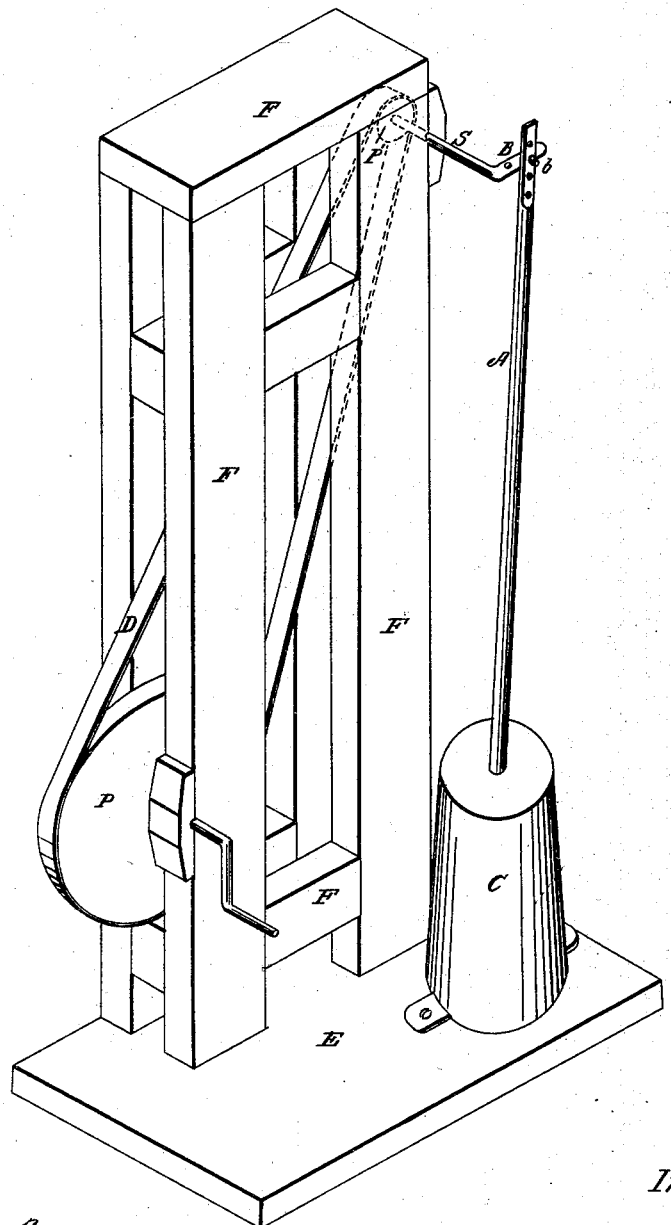
Witnesses:
Thomas Randall
R. J. Littlepage
Inventor:
Abel Newbrough

UNITED STATES PATENT OFFICE.

ABEL NEWBROUGH, OF MADISONVILLE, KENTUCKY.

IMPROVEMENT IN CHURNS.

Specification forming part of Letters Patent No. 49,138, dated August 1, 1865.

*To all whom it may concern:*

Be it known that I, ABEL NEWBROUGH, of Madisonville, Hopkins county, State of Kentucky, have invented a new and Improved Churning-Machine; and I do hereby declare that the following is a full and exact description thereof, reference being had to the accompanying drawing, and to the letters of reference marked thereon.

The nature of my invention consists in a frame-work, F, of four uprights, with top and bottom rails, and head-piece.

The frame is erected on a base, E, enough wider than the frame for a churn, C, to stand thereon in position indicated on drawing. Between the uprights of the frame are two pulleys, P, the lower one twenty inches in diameter, on a shaft with hand-crank attached, placed at a proper height to suit the operator. The upper pulley, P', is five inches in diameter, on a crank-shaft, S, five feet six inches from the base. The crank B on this shaft is four inches long, to which is attached the churn-staff A, five feet six inches long. This connection can be lengthened or shortened at pleasure by changing the connecting-bolt $b$ to suit the quantity of cream in the churn. The pulleys are connected with a belt, D, two inches wide. The whole constitutes a cheap and easy machine.

What I claim as my improvement, and desire to secure by Letters Patent, is—

The frame F, pulleys P P', belt D, the crank B, and staff A and adjustment, as shown at $b$, the several parts being constructed and arranged in relation to the churn C, as and for the purpose specified.

ABEL NEWBROUGH.

Witnesses:
    E. G. DAVIS,
    R. J. LITTLEPAGE.